United States Patent [19]
Tzidon et al.

[11] Patent Number: 5,807,109
[45] Date of Patent: Sep. 15, 1998

[54] AIRBORNE AVIONICS SIMULATOR SYSTEM

[75] Inventors: Aviv Tzidon, Azur; Menachem Polak, Tel Mond post, both of Israel

[73] Assignee: B.V.R. Technologies Ltd., Givatayim, Israel

[21] Appl. No.: 405,300

[22] Filed: Mar. 16, 1995

[51] Int. Cl.[6] .............................. G09B 9/26; G09B 9/40; G09B 9/44; F41A 33/00

[52] U.S. Cl. .................. 434/35; 434/2; 434/14; 434/30

[58] Field of Search .................. 434/11, 14, 15, 434/29, 30, 33–35, 49, 37, 2, 5

[56] References Cited

U.S. PATENT DOCUMENTS

| | | | |
|---|---|---|---|
| 4,176,468 | 12/1979 | Marty | 434/14 |
| 4,424,038 | 1/1984 | Tingleff et al. | 434/2 |
| 4,490,117 | 12/1984 | Parker | 434/35 |
| 4,729,737 | 3/1988 | Reagan et al. | 434/35 |
| 4,835,537 | 5/1989 | Manion | 342/30 |
| 5,002,490 | 3/1991 | Blackstone | 434/14 |
| 5,421,728 | 6/1995 | Milden | 434/5 |
| 5,428,530 | 6/1995 | Brown et al. | 434/14 X |

FOREIGN PATENT DOCUMENTS

| | | | |
|---|---|---|---|
| 309133 | 3/1989 | European Pat. Off. | 434/14 |
| 0 370 903 | 5/1990 | European Pat. Off. | |
| 0654776A2 | 11/1994 | European Pat. Off. | |
| WO90/07172 | 6/1990 | WIPO | |
| WO92/22050 | 12/1992 | WIPO | |
| 94/02795 | 2/1994 | WIPO | 434/11 |
| WO94/11751 | 5/1994 | WIPO | |
| WO9524706 | 9/1995 | WIPO | |

*Primary Examiner*—Richard J. Apley
*Assistant Examiner*—John Mulcahy
*Attorney, Agent, or Firm*—Schwegman, Lundberg, Woessner & Kluth, P.A.

[57] ABSTRACT

An airborne avionics simulator system integrated into a low-cost host aircraft to simulate the avionics of a high performance aircraft. The simulated avionics system includes for example radar, radar warning, chaff, radar locks, weapons systems, electronic defensive systems, and navigation systems. The airborne avionics simulator system can be programmed with various scenarios, such as air-to-air or air-to-ground combat, navigational situations, aircraft malfunctions, and general training routines. A multi-function display provides for simulating the avionics of various high performance aircraft. Additionally, the cockpit of the host aircraft may be modified to simulate the control stick, throttle assemblies and other aspects of a particular high performance aircraft.

22 Claims, 5 Drawing Sheets

AIRBORNE AVIONICS SIMULATOR SYSTEM

FIELD OF THE INVENTION

The present invention relates to an airborne avionics simulator system, and in particular, to a method and apparatus for simulating the avionics of high-performance aircraft in a low-cost host aircraft.

BACKGROUND OF THE INVENTION

It typically costs millions of dollars to train a single pilot throughout the course of his or her career. In addition to classroom training, a pilot will log a significant number of hours in a variety of aircraft and in ground based simulators in order to maintain and enhance flight skills.

Ground based simulators provide a low cost method for training a pilot on wide spectrum of skills, including cockpit and emergency procedures, as well as advanced tactical training. Flight simulators for high performance aircraft typically record the performance of the pilot for future debriefing and computerized analysis. Ground based flight simulators typically include a method for presenting pre-programmed scenarios to the pilot. Alternatively, multiple simulators may be networked to simulate combat situations. Flight simulators have also proven to be particularly useful as a low cost method for evaluating the aptitude of new pilots and for providing basic flight training.

Significant steps have been taken to make ground based flight simulators as realistic as possible. For example, a realistic cockpit mockup may be mounted on a movable stage to create the sensation of movement. Additionally, audio signals may be provided to simulate the sounds of the aircraft and avionics. However, ground based flight simulators have a limited ability to duplicate the sensations of acceleration, vibration, etc. Additionally, ground based simulators can not accurately duplicate the sensory responses to flight, such as visual or vestibular, or the psychological responses, such as fear.

An alternative to ground based flight simulators is actual flight time in the aircraft for which the pilot is training. However, high performance military aircraft are extremely expensive to purchase and operate. For example, the purchase price of an F15 is approximately $50 M, and the aircraft costs approximately $15,000 per hour to fly. Additionally, on average, an F15 requires 5 hours of maintenance for each hour of flight. Use of high performance aircraft for training reduces the life span of the aircraft and increases the chance of fatal accidents. Therefore, the cost and resource consumption of training pilots in high performance aircraft can be prohibitive.

SUMMARY OF THE INVENTION

The present invention is directed to a method and apparatus for training and evaluating pilots on aircraft avionics and combat strategies. An airborne avionics simulator system is integrated into a low-cost host aircraft. The present invention may also be used for sport or game applications.

Integrating simulated avionics into a low-cost aircraft permits a pilot to obtain a large number of actual flight hours while enhancing his skills with general or specific avionics that may be encountered in a particular high performance aircraft. The host aircraft can typically be purchased and operated for a fraction of the cost of the high performance aircraft being simulated.

The simulated avionics system includes for example radar, radar warning, chaff, radar locks, weapons systems, electronic defensive systems, and navigation systems. The airborne avionics simulator system can be programmed with various scenarios, such as air-to-air or air-to-ground combat, navigational situations, aircraft malfunctions, and general training routines.

A multi-function display is provided for simulating the avionics of various high performance aircraft. Additionally, the cockpit of the host aircraft may be modified to simulate the control stick and/or throttle assemblies of a particular high performance aircraft. The avionics simulator system may also create various audio signals which are specific to a particular high performance aircraft.

The airborne avionics simulator system may include a removable data storage module with a removable data storage media. The removable data storage module can records a pilot's performance or score for later analysis and debriefing and upload flight scenarios into the system.

The present airborne avionics simulator system may include a data link for communicating with other host aircraft containing a compatible avionics simulator system. The data link permits a group of pilots to interact either spontaneously or according to a preprogrammed scenario, or a combination thereof. The datalink permits a pilot to train with actual, rather than simulated or virtual targets. The datalink may also be used in connection with an anti-collision warning system.

The airborne avionics simulator system for use in a host aircraft is interfaced to the host aircraft and generates simulated avionics data indicative of a high performance aircraft. At least one display is provided for communicating simulated avionics data to a pilot. A mechanism for acquiring position data of the host aircraft is also provided. A pilot interface for interacting with the avionics simulation system allows the pilot to respond to the simulated avionics data.

One method of the present invention includes interfacing an avionics simulation system for generating simulated avionics data of a high performance aircraft with a low-cost host aircraft. The avionics simulation system generates simulated avionics data and displays the simulated avionics data to a pilot flying the host aircraft. The avionics simulation system accepts input data from the pilot to the avionics simulation system in response to the simulated avionics data displayed to the pilot.

Definitions as used in this application:

"Avionics" means aviation electronics such as radar, radar warning systems, chaff, radar locks, weapons systems, electronic jamming and defensive systems, and navigation systems.

"High performance aircraft" means state of the art civilian or combat aircraft with high purchase and maintenance costs, such as, by example but not by limitation, the F14 or F5, available from Northrop-Grumman; F16 Falcon, available from Lockheed; F15 Eagle, F18 or A4 available from McDonnell Douglas; Mirage 2000, available from Dasaullt Aviation located in France; Harrier available from British Aerospace; Tornado available from Panavia; MIG 21, 23, 27, 29, and 31 available from Mikoyan; and the Sukhoi 21, 22, 27, 29, and 31 available from Sukhoi.

"Host aircraft" means low-cost civilian aircraft, military training aircraft, or obsolete military aircraft having virtually no resident avionics, such as the MB-339 or MB-326 available from Air Macchi located in Israel; Alpha Jet (Fuga), available from Dasuallt Aviation located in France; Tucano, available from Embraer located in Brazil; the Hawk 100 and Hawk 200, available from British Aerospace; the PC9 and PC7 available from Pilatos located in Switzerland;

T-45 trainer, available from McDonnell Douglas located in St. Louis, Mo.; and L-39 and L-59 available from Aero located in Czechslovakia.

Those skilled in the art will readily recognize a wide variety of equivalent aircraft suitable for use with the present invention, both commercial and military, upon reading the following specification.

DETAILED DESCRIPTION OF THE PREFERRED EMBODIMENT

The present airborne avionics simulator system includes hardware and software which is installed into a low-cost host aircraft that simulates the avionics of a particular high performance aircraft. The airborne avionics simulator system can be configured to simulate a wide variety of high performance aircraft. The system permits the pilot to engage with virtual targets preprogrammed into the simulator system or actual targets, such as other host aircraft containing a compatible airborne avionics simulator system.

Figure 1:
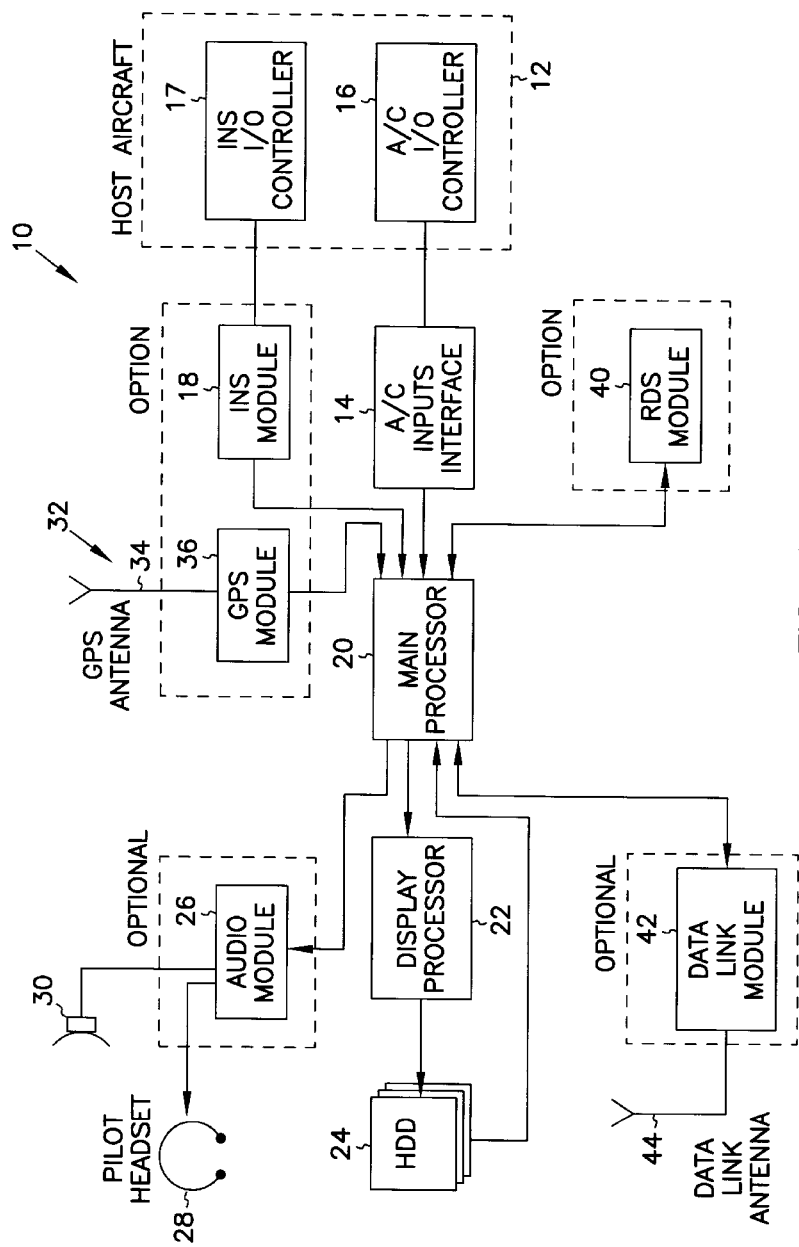
FIG. 1 is a schematic illustration of the present airborne avionics simulator system incorporated into an exemplary host aircraft.

FIG. 1 is a schematic hardware illustration of the present airborne avionics simulator system 10 installed into a host aircraft 12. An aircraft input interface 14 reads the inputs from input/output (I/O) controllers 16 in the host aircraft 12. The I/O controller 16 is intended to represent a variety of I/O controllers such as for the stick, throttle, switches, instrumentation and position data that may be available from the host aircraft 12. Some host aircraft 12 may include an inertial navigation system (INS). INS module 18 reads INS navigation data from the INS I/O controller 17. A multifunction display 24 having operational selectable buttons 24A–24T may also be a conduit for I/O to the system 10 (see FIG. 2).

The INS module 18 and aircraft input interface 14 transmits I/O data from the host aircraft 12 to the main processor 20. The main processor 20 runs a main simulation system 70 (see FIGS. 4 and 5) and generates a simulation of the aircraft's sensors, which is transmitted to a combination display processor and video module 22 or audio module 26. The display processor 22 controls the main display 24, which will be discussed in connection with FIGS. 2 and 3. The audio module 26 reproduces the audio signals of the selected high performance aircraft and transmits them to the pilot either via a headset 28 or a speaker 30 in the cockpit. It will be understood that the display 24 may either be added to the host aircraft 12, or an existing display may be used.

A global positioning system (GPS) 32, including an antenna 34 and GPS module 36 transmits GPS data to the main processor 20. A removable data storage module 40 communicates with the main processor 20 to provide mission/scenario data and to collect mission flight data for future debriefing and analysis. The removable data storage module 40 preferably includes flash read-only-memory (ROM) and/or a removable magnetic media that can be taken from the host aircraft 12 to be analyzed on a separate computer (not shown).

A data link module 42 and corresponding antenna 44 are provided for communicating with other host aircraft containing a compatible airborne avionics simulator system and ground based monitoring stations. As will be discussed below, the airborne avionics simulator system 10 can operate either with preprogrammed virtual targets or other aircraft containing a compatible simulator system as actual targets, or a combination of both. The data communication module 42 permits a group of host aircraft to exchange position data which can be displayed on the main display 24, to simulate radar locks and missile launches, to evaluate the evasive tactics of a pilot relative to an enemy aircraft, such as through the use of certain maneuvers, chaff, and flares, as well as to score the performance of individual pilots. The data link module 42 permits multiple host aircraft to participate in simulated combat activity in the same way as multiple ground based flight simulators. The data link can also be used to receive real-time changes to a mission scenario from a ground based stations, such as from a flight instructor, or to permit flight instructors or other students located in the cockpit with the pilot to actively participate in the mission simulation. One method and apparatus for accomplishing this data link known to be suited for this purpose is described in U.S. Pat. No. 5,396,644, issued Mar. 7, 1995, entitled "Method and System for Communicating Between Moving Participants", which is hereby incorporated by reference. It will be understood that a variety of data link protocols may be used with the present airborne avionics simulator system 10.

Additionally, position data for each aircraft exchanged through the data link module 42 can be used as part of an anti-collision warning system for a group of host aircraft 12. One possible anti-collision warning system suitable for the present invention is disclosed in U.S. Pat. No. 5,325,302, issued on Jun. 28, 1994, entitled "GPS-Based Anticollision Warning System," which is hereby incorporated by reference.

In one embodiment, the cockpit of the host aircraft 12 is modified to simulate the cockpit of a particular high performance aircraft, including various displays and system operations. For example, the stick and throttle assemblies may be modified to match the relevant switchology of the high performance aircraft, or to add more switches. Additionally, simple displays or multi-function displays may be added to the cockpit to simulate radar, electronic warfare displays, etc. On some host aircraft, existing displays can be utilized to minimize the conversion cost.

Figure 2:
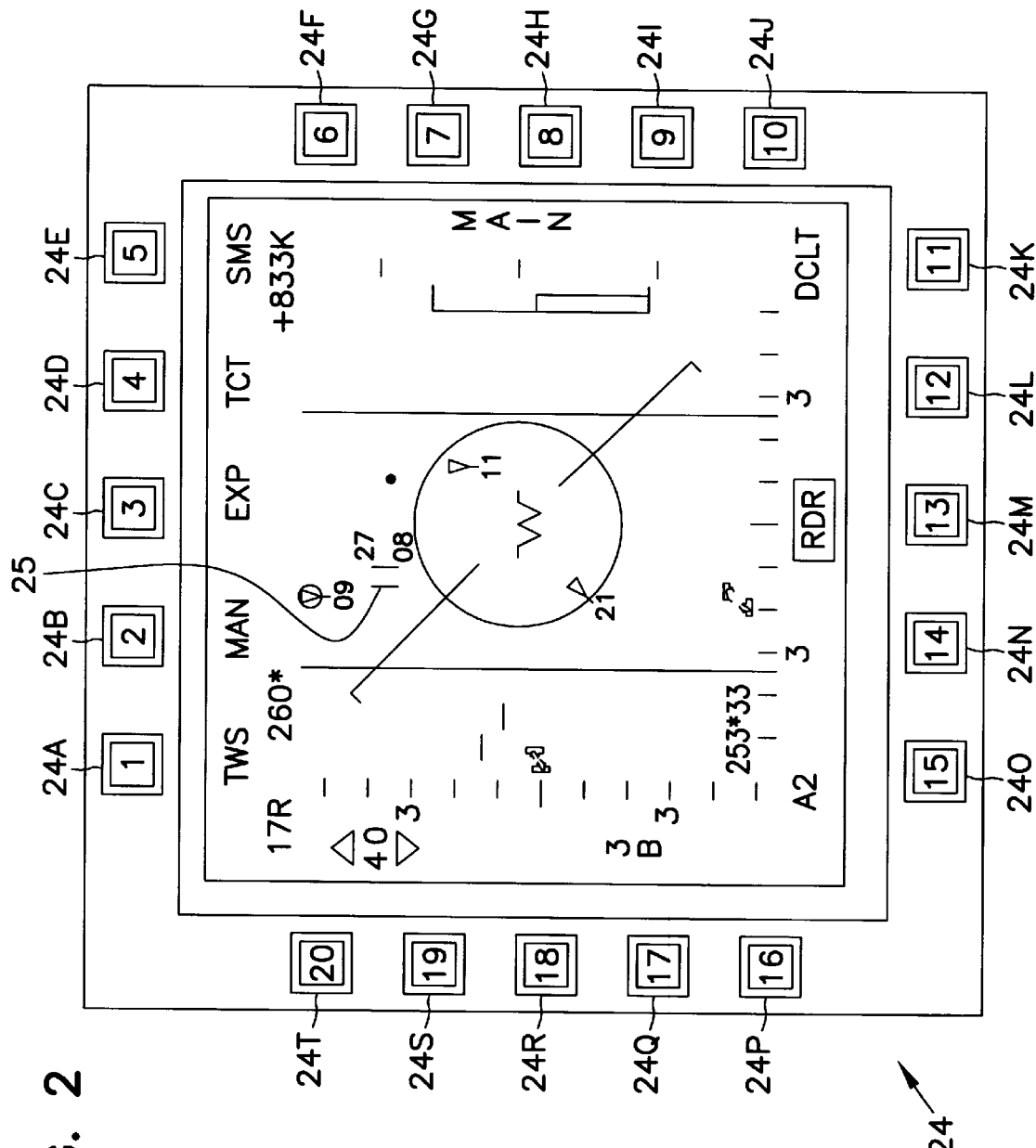
FIG. 2 is an exemplary multifunction radar display.
Figure 3:
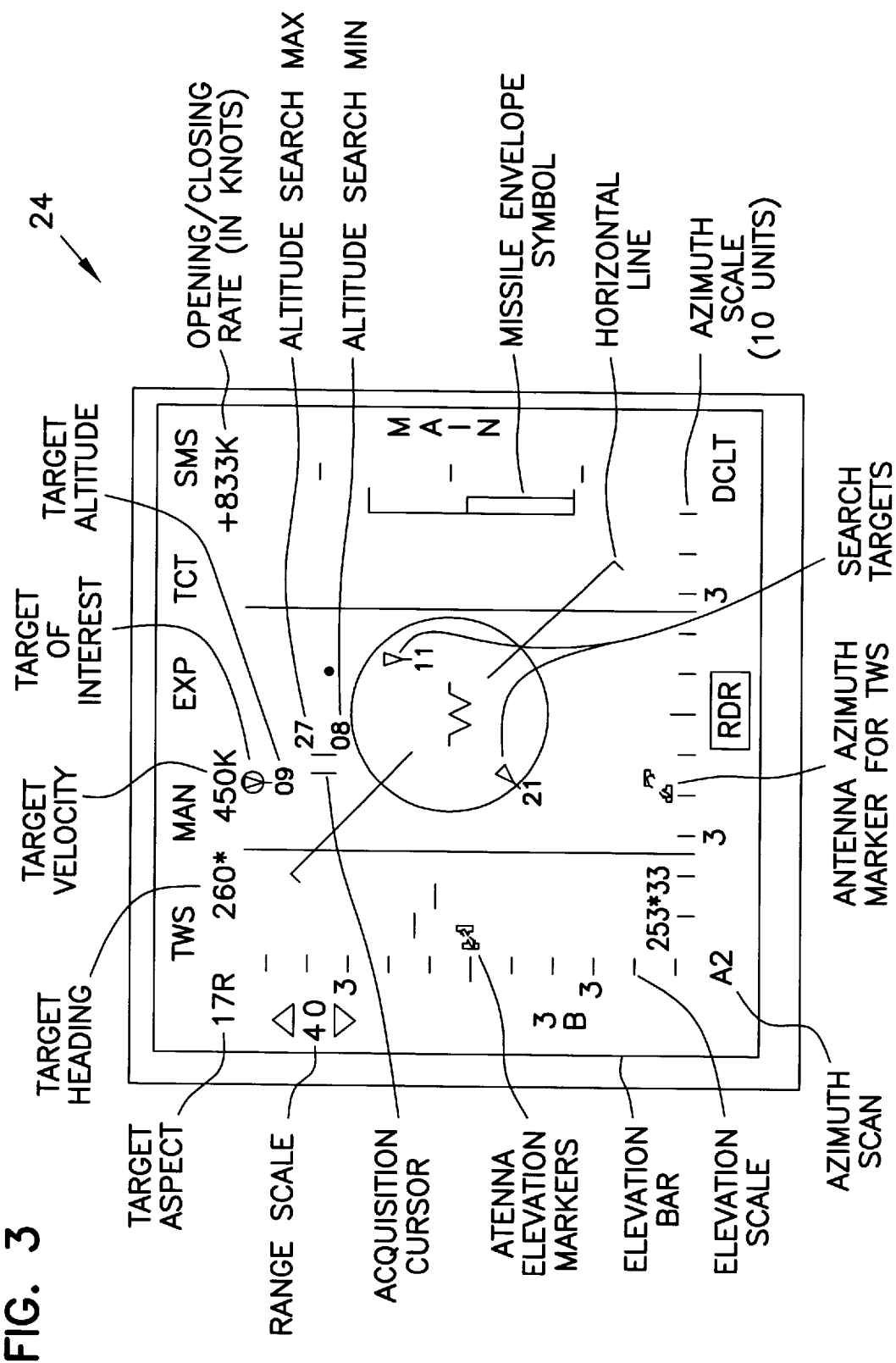
FIG. 3 illustrates the contents of the multifunction radar display of FIG. 2.

FIGS. 2 and 3 illustrate an exemplary radar display 24 containing a plurality of operational selectable buttons (OSB) 24A–24T. Operational selectable buttons 24A–24T serve a variety of functions on the display 24 and can be programmed to simulate a particular type of high performance aircraft. Input data entered through the operational selectable buttons 24A–24T is transmitted back to the main processor 20, as illustrated in FIG. 1.

OSB 24A allows the pilot to toggle between different radar modes. For example, a pilot can track a particular target, while a scan mode gives the pilot an interleaved search/track capability. In the track-while-scan (TWS) mode, the radar tracks the acquired target for a short interval, searches the zone controlled by the pilot around an acquisition corral 25, and then returns to track the target. The exemplary acquisition corral shown in FIG. 2 is represented by parallel vertical lines on the display 24 corresponding to the area where the search was done. OSB 24B allows the pilot to toggle between manual track-while-scan (TWS) radar acquisition or automatic radar acquisition. In the manual (MAN) mode, the pilot can acquire the targets according to his own judgment. In the AUTO mode, the radar acquires the targets according to a predetermined priority.

The OSB 24C button allows the pilot to expand part of the radar display 24. The expanded mode provides improved detectability of targets by using a narrow radar pulse which helps the pilot to discriminate multiple targets that may be flying in close formation. OSB 24D activates the tactical display. In this mode, the pilot receives vital information about ground threats, enemy airports, preplanned navigation points, training areas, ground target position, and anti-aircraft missile zones.

OSB 24E allows the pilot to review the store management system, which provides the pilot with an inventory of weapons available during the mission. OSB 24H allows the pilot to switch to the main system menu. In this display, the pilot can load new scenarios in the system 10. OSB 24K allows the pilot to page through various levels of decluttering of the radar symbology. OSB 24M permits the pilot to select the radar display. In the exemplary radar display of FIG. 2, the RDR radar mode is activated. The other modes include declutter (DCLT), track while scan (TWS), manual (MAN), expand (EXP), tactical (TCT), and store management system (SMS).

OSB 240 permits the pilot to select the antenna azimuth scan width. The switch toggles between three scan options of, ±10°, ±30°, and ±60°. OSB 24Q allows the pilot to select the antenna scan pattern in elevation when in normal air modes. The elevation scans available are 1–4 bars. OSB 24S and 24T allow the pilot to select the maximum display range in nautical miles for all radar operations. The ranges available are 10/2.5, 20/5, 40/10, and 80/20, respectively. Buttons 24F, G, I, J, L, N, P and R are available for use with other functions on the multi-function display 24.

Figure 4:
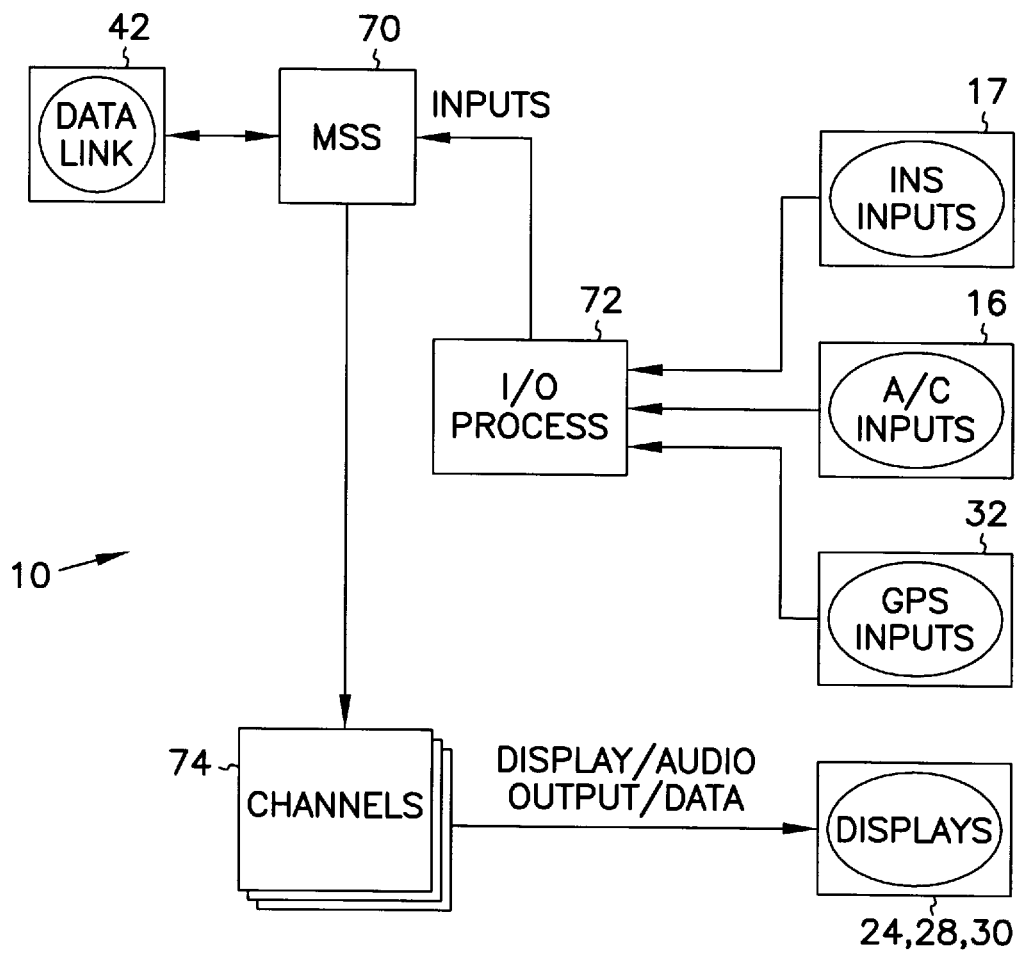
FIG. 4 is a schematic illustration of the software of the present airborne avionics simulator system.

FIG. 4 is a schematic illustration of the main simulation system (MSS) software 70 of the present airborne avionics simulator system 10. I/O process 72 is a compact program with an endless loop that reads hardware inputs 16, 17, 32 and converts them to a format that can be interpreted by the main simulation system 70. The main simulation system 70 receives inputs from the I/O process 72 and datalink module 42, and performs all simulation calculations based on pre-programmed logic. Output from the main simulation system 70 is transmitted over a plurality of channels 74 in alpha-numeric form to the audio and visual user interface displays 24, 28, 30.

Figure 5:
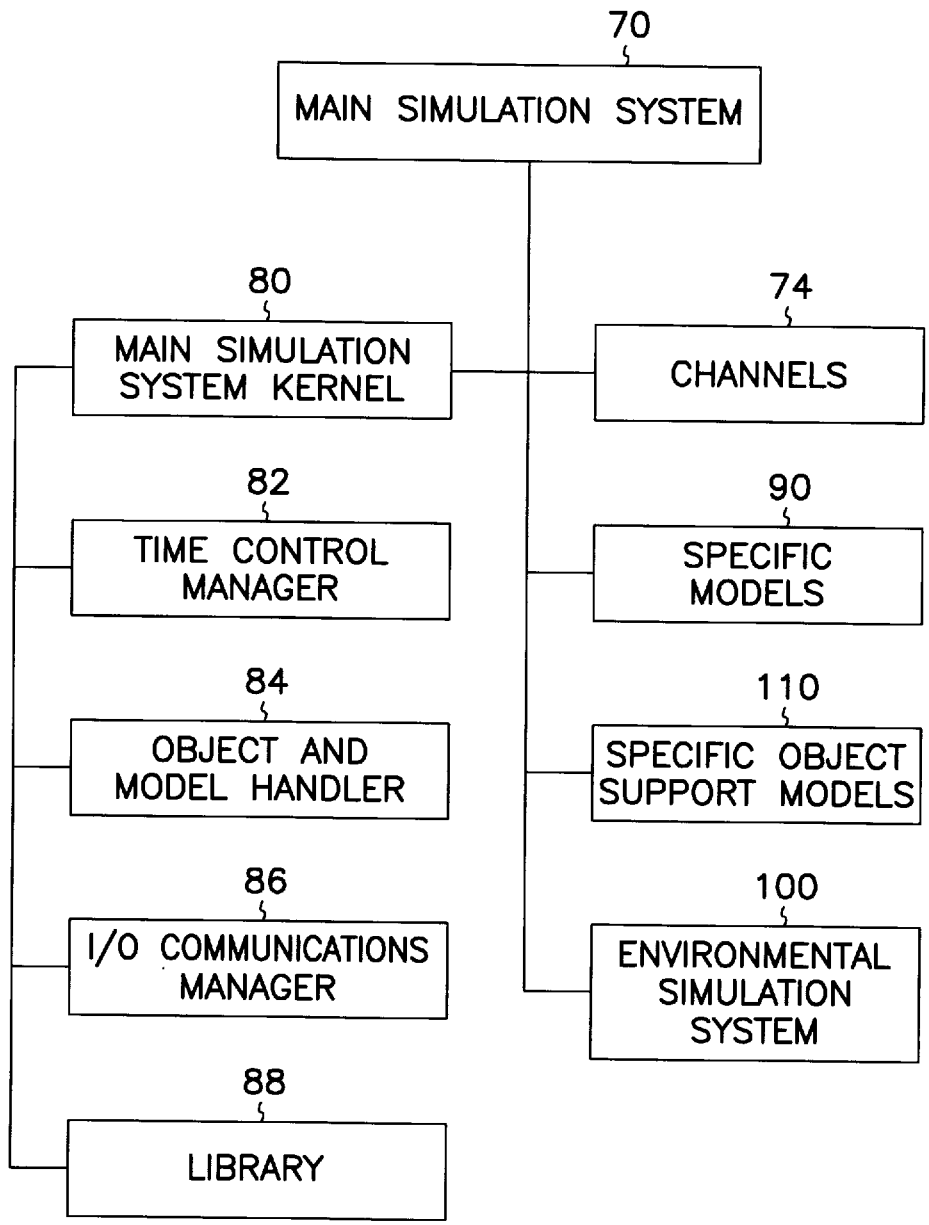
FIG. 5 is a schematic illustration of the main simulator software system of the present airborne avionics simulator system.

FIG. 5 is a schematic illustration of various modules in the main simulation system software 70. A main simulation system kernel (MSSK) 80 is a generic part of the main simulation system 70. The kernel 80 contains 4 components; a time control manager 82, an object and model handler 84, an I/O and communications manager 86, and a library 88.

The main simulation system kernel 80 mainly deals with activating models 90, 100, 110 which are connected to objects in the simulation world. These models simulate the entire aircraft environment, including virtual hostile targets, missiles, chaff, flares, and other environmental factors. A model is actually a collection of routines, defined under a rigid set of principle that performs a simple input-process-output cycle during each time unit. The inputs arrive to the main simulation system kernel 80 either from the last time unit of a particular model, from the hardware of the host aircraft 12, or from other models. The model handling function is a one-step advancement according to the model's logic. The outputs are sent back to the main simulation system kernel 80, either to be saved for the next step or to be distributed to other models or to the channels 74.

Each object in the simulated world is of a certain "type," which is actually defined as a set of models. For example, the type "MIG 23" has a specific flight model, weapons system model, radar model, and other characteristics. The "type" determines which models are activated for each object. The models are divided into three general categories: general, support, and specific. The environmental simulation system 100 is the body of general models which includes position models in charge of the movement of bodies such as existing aircraft, ships, land vehicles, and projectiles. Control models deal with the way an object is steered, automatically or manually, according to a fixed course or set of rules. The "brain" function evaluates the set of rules governing the behavior of some of the non-manual objects according to a set of if-then rules. These rules are based on inner variables, like the type of armaments, the status of the armaments, position, velocity, etc. The general electronics system includes generic systems like radar, radar warning receiver, display, etc.

A variety of parameters are available for editing a particular scenario, including the number of targets, the type of targets, and the behavior of a particular target. Each target can be assigned a "brain" which determines the tactical and doctrinaire behavior of that particular target. As discussed above, "brains" may be tailored according to various training objectives or known enemy doctrines. A default weapons configuration is attached to each aircraft type. However, the weapons configuration can be tailored for a particular scenario.

The time control manager 82 is responsible for the time access, including time unit length and the initiation of various functions during each time unit. In each time unit, a set of models is advanced for each object in the simulated world. The process of advancing the models consists of receiving inputs, calculating the next step, and saving the outputs to be used as inputs for the next time unit. The object and model handler 84 acts as an interface to the specific model (SM) 90, environmental simulation system (ENVISM) 100, and specific object support models (SOSM) 110 items (as will be discussed in detail below).

The I/O and communications manager 86 is responsible for all I/Os, as well as communications with the main simulation system 70. This group of functions includes inputs from the host aircraft 12, fast parallel communications of the simulations results from the main simulation system 70 to the channels 74, and messages and reports between the kernel 80 and the models 90 and 110. The libraries 88 include all the general services of the main simulation system 70, such as I/O utilities, trigonometric calculations, and other mathematical calculations.

The specific object support models 110 are added to the specific objects 90 to support them in generic tasks, such as score model and sound model. The score model calculates grades for trainees, based on a set of predefined rules, such as weapon operating rules, emergency procedures, etc. The sound model receives and calculates all the sound events determined by the main simulation system 20 and sends them to the audio module 26.

Specific models 90 are responsible for the simulation of a specific type of high performance aircraft. The specific models 90 include all logic governing the behavior of the actual high performance aircraft, such as radar, radar warning receivers (RWR), head up display (HUD), and weapons management.

The channels 74 are programs that read the simulation results from the main simulation system 70 and translates the data into audio/visual data which is presented to the pilot through the various displays 24, 28, 30. In the preferred embodiment, a separate channel exists for each of the various audio/visual models determined by the main simulation system 70, such as radar screen, RWR screen, sounds, etc.

The main simulation system software 70 is designed to provide a variety of combat scenarios, including air-to-air, or air-to-ground combat, navigation scenarios, malfunctions, and general training routines. The air-to-air scenario of the main simulation systems software 70 can be programmed to simulate a variety of enemy targets of various types and configurations. This programming may be done either with virtual or actual targets. Non-intelligent virtual targets typically fly a predetermined path throughout the scenario without relating to the pilot and without operating weapons systems. On the other hand, virtual intelligent targets are driven by the rule based system referred to above as the "brain." The brain controls target actions relating to the pilot's actions and maneuvers, attempting to intercept the pilot and engage in combat activities using appropriate radar and weapons systems capabilities. A time limit can be provided for each user participating in a given scenario. Additionally, the weapons available to the pilot and the enemy targets can also be configured to simulate available weapons technology.

The main simulation software 70 also includes full air-to-ground and air-to-sea capabilities with appropriate digital radar display symbology and HUD symbology associated with air-to-ground attack profiles. Air-to-ground training scenarios may also include navigation functions including pre-programmed reference locations. In the typical air-to-ground scenario, the pilot performs a complete navigation to the target and uses relevant HUD symbology for checking various reference points on the ground visually. The system 10 will present the pilot with HUD update capabilities. INS drift may also be programmed into a particular scenario. Air to ground scenarios may also be combined with air-to-air missions, enabling realistic training through hostile environments with rapid switching between air-to-air missions and intercepts while in air-to-ground exercises.

The main simulation system software 70 also allows for instrument flight and all-weather flight training, as well as scenarios requiring night vision goggles. With regard to various weather conditions, the main processor 20 can alter the output to the main display 24 to incorporate a variety of weather conditions or limitations on the avionics associated with weather conditions. Finally, the main simulation system software 70 can simulate a variety of malfunctions in the avionics or host aircraft 12.

When a simulation is completed, the pilot receives a score for his or her performance. Each rule in the scoring routing is given a weight, negative weights being penalties and positive weights being bonuses. The specific object support models 110 checks for occurrences of events identified in the rule list per time slice or frame and multiplies occurrences by the weight. The grand total of all multiplications along the scenario constitute the final score of the pilot for the particular scenario. The score model can be edited and changed so that the weights of the various rules reflect the policy or doctrine of a particular air force or squadron.

The main simulation system 70 software may be based on a ground based flight simulation system sold under the name "Hot Shot Combat Tactical Trainer," available from BVR Technologies, LTD., located in Givatayim, Israel, the assignee of the present invention. However, it will be understood that a wide variety of flight simulator software products may be suitable for use in the present airborne avionics simulator system 10. Additionally, air-to-ground simulations performed by the main simulation system software 70 may be based on a ground based air-to-ground flight simulation system sold under the name Guided Weapons (EO/IR) Trainers, also available from BVR Technologies, LTD.

Although the invention has been described with respect to specific preferred embodiments, it should be appreciated that other embodiments utilizing the concept of the present invention are possible without departing from the scope of the invention. The invention, for example, is not intended to be limited aircraft, but may be used to simulate training in armored vehicles, tanks, or any other environment where simulated training is desirable.

What is claimed is:

1. An airborne avionics simulator system for use in a host aircraft, comprising:

an avionics simulation system operable for installation into a host aircraft, which lacks one or more avionics systems, and for generating simulated avionics data indicative of a high performance aircraft having the one or more avionics systems that a host aircraft lacks, comprising:

an information interface for receiving position data from the host aircraft:

at least one display for communicating simulated avionics data of the one or more avionics systems that the host aircraft lacks to a pilot in the form found in the high performance aircraft;

position module operable for acquiring position data of the host aircraft; and a pilot interface for interacting with the avionics simulation system in response to the simulated avionics data; and a main processor connected to the information interface, connected to the at least one display, connected to the position module, and connected to the pilot interface, and programmed to produce the avionics data indicative of the high performance aircraft the avionics data including radar data and navigation data.

2. The system of claim 1 wherein the position module includes a global positioning system module.

3. The system of claim 1 wherein the simulated avionics data comprises at least one pre-programmed scenario.

4. The system of claim 1 further including a data communications system connected to the main processor for providing data exchange between a plurality of airborne avionics simulator systems.

5. The system of claim 1 further including:

a data communications system connected to the main processor for exchanging position data between a plurality of airborne avionics simulator systems; and an anti-collision system utilizing the position data to warn a pilot of a potential collision.

6. The system of claim 1 wherein the information interface with the host aircraft comprises means for obtaining control stick or throttle data from the host aircraft.

7. The system of claim 1 wherein the information interface with the host aircraft further operates to obtain inertial navigation data from the host aircraft.

8. The system of claim 1 wherein the at least one display for communicating simulated avionics data to a pilot includes an audio/visual display device.

9. The system of claim 1 wherein the pilot interface comprises a plurality of programmable input devices which may be configured to simulate a variety of high performance aircraft.

10. The system of claim 1 wherein the simulated avionics data is selected from the group consisting of: radar data, radar warning systems data, weapons systems, weapons systems operation data, electronic defensive systems data and navigation data.

11. The system of claim 1 wherein the host aircraft and the high performance aircraft are the same model but the host aircraft lacks one or more of the avionics systems of the high performance aircraft being simulated.

12. The system of claim 1 wherein the host aircraft is a more expensive model than the high performance aircraft and the host aircraft lacks one or more of the avionics systems of the high performance aircraft being simulated.

13. A method for simulating avionics of a high performance aircraft having one or more avionics systems in a host aircraft lacking the one or more avionics systems, comprising the steps of:

establishing a communications link between an avionics simulation system and host aircraft;

generating simulated avionics data of a high performance aircraft;

displaying the simulated avionics data in the format of the high performance aircraft to a pilot flying the host aircraft;

accepting input data from the pilot to the avionics simulation system in response to the simulated avionics data displayed to the pilot and wherein the simulated avionics data comprises radar data and navigation data.

14. The method of claim 13 further including the step of acquiring position data for the host aircraft.

15. The method of claim 13 wherein the step of generating simulated avionics data includes generating simulated avionics data according to at least one pre-programmed scenario.

16. The method of claim 13 further including the step of exchanging simulated avionics data between a plurality of host aircraft.

17. The method of claim 11 further including the steps of:

exchanging position data between a plurality of host aircraft; and utilizing the position data to provide an anti-collision system to warn a pilot of a potential collision.

18. An airborne avionics simulator system for use in a host aircraft, comprising:

an avionics simulation system for installation into a host aircraft for generating simulated avionics data indicative of a high performance aircraft, comprising:

at least one display for communicating simulated avionics data to a pilot;

means for acquiring position data of the host aircraft;

a pilot interface for interacting with the avionics simulation system in response to the simulated avionics data; and wherein the simulated avionics data includes radar data, radar warning systems data, weapons systems operation data, electronic defensive systems data and navigation data.

19. A method for simulating avionics of a high performance aircraft in a low cost host aircraft, comprising the steps of:

establishing a communications link between an avionics simulation system for generating simulated avionics data of the high performance aircraft and the host aircraft;

generating simulated avionics data;

displaying the simulated avionics data to a pilot flying the host aircraft;

accepting input data from the pilot to the avionics simulation system in response to the simulated avionics data displayed to the pilot; and wherein the simulated avionics data comprises radar data, radar warning systems data, weapons systems operation data, electronic defensive systems data and navigation data.

20. The method of claim 13 wherein the simulated avionics data is selected from the group consisting of; radar data, radar warning systems data, weapons systems, weapons systems operation data, electronic defensive systems data and navigation data.

21. An airborne avionics simulator system for use in a host aircraft, comprising:

an avionics simulation system operable for installation into a host aircraft, which lacks one or more avionics systems, and for generating simulated avionics data indicative of a high performance aircraft having the one or more avionics systems that a host aircraft lacks, comprising:

an information interface for receiving position data from the host aircraft;

at least one display for communicating simulated avionics data of the one or more avionics systems that the host aircraft lacks to a pilot in the form found in the high performance aircraft;

position module operable for acquiring position data of the host aircraft; and a pilot interface for interacting with the avionics simulation system in response to the simulated avionics data; and a main processor connected to the information interface, connected to the at least one display, connected to the position module, and connected to the pilot interface, and programmed to produce the avionics data indicative of the high performance aircraft, the avionics data including weapons systems data and navigation data.

22. A method for simulating avionics of a high performance aircraft having one or more avionics systems in a host aircraft lacking the one or more avionics systems, comprising the steps of:

establishing a communications link between an avionics simulation system and a host aircraft;

generating simulated avionics data of a high performance aircraft;

displaying the simulated avionics data in the format of the high performance aircraft to a pilot flying the host aircraft;

accepting input data from the pilot to the avionics simulation system in response to the simulated avionics data displayed to the pilot; and wherein the simulated avionics data comprises weapons systems and navigation data.

* * * * *

UNITED STATES PATENT AND TRADEMARK OFFICE
CERTIFICATE OF CORRECTION

PATENT NO. : 5,807,109
DATED : Sep. 15, 1998
INVENTOR(S) : Aviv Tzidon, et al.

It is certified that error appears in the above-identified patent and that said Letters Patent is hereby corrected as shown below:

At Col. 9, line 26, please insert --a-- before "host aircraft".

At Col. 10, line 19, replace ";" with --:--.

At Col. 10, line 64, insert --data-- after "weapons systems".

Signed and Sealed this

Ninth Day of November, 1999

Attest:

Attesting Officer

Q. TODD DICKINSON

Acting Commissioner of Patents and Trademarks